United States Patent
Xie et al.

(10) Patent No.: US 8,661,891 B2
(45) Date of Patent: Mar. 4, 2014

(54) APPARATUS AND METHOD FOR MEASURING THE LIQUID LEVEL OF MOLTEN METAL

(75) Inventors: Zhi Xie, Shenyang (CN); Zhenwei Hu, Shenyang (CN); Ying Ci, Shenyang (CN); Da Zhang, Shenyang (CN)

(73) Assignees: Northeastern University, Shenyang (CN); Shenyang Taihe Metallurgy Measurement & Control Technology Co., Ltd., Shenyang (CN)

( * ) Notice: Subject to any disclaimer, the term of this patent is extended or adjusted under 35 U.S.C. 154(b) by 503 days.

(21) Appl. No.: 12/994,410

(22) PCT Filed: Oct. 28, 2008

(86) PCT No.: PCT/CN2008/072856
§ 371 (c)(1),
(2), (4) Date: Nov. 23, 2010

(87) PCT Pub. No.: WO2010/048751
PCT Pub. Date: May 6, 2010

(65) Prior Publication Data
US 2011/0063628 A1  Mar. 17, 2011

(51) Int. Cl.
*G01F 23/00* (2006.01)
(52) U.S. Cl.
USPC .......................................................... 73/295
(58) Field of Classification Search
USPC .............................. 73/295; 374/26
See application file for complete search history.

(56) References Cited

U.S. PATENT DOCUMENTS

| 3,663,204 A | 5/1972 | Jungwirth ........................ 75/375 |
| 3,717,034 A * | 2/1973 | Dukelow et al. ............... 374/140 |
| 5,169,233 A * | 12/1992 | Montgomery et al. ....... 374/124 |
| 6,923,573 B2 * | 8/2005 | Yamashita et al. ............. 374/139 |
| 2004/0047395 A1 | 3/2004 | Xie et al. ....................... 374/139 |

FOREIGN PATENT DOCUMENTS

| CN | 1261657 A | 8/2000 |
| CN | 1333455 A | 1/2002 |

(Continued)

OTHER PUBLICATIONS

"A New Method of Automatic Detection of Melted Metal Surface," Chinese Journal of Sensors and Actuators, vol. 18, No. 2, Jun. 2005.

*Primary Examiner* — Peter Macchiarolo
*Assistant Examiner* — Tamiko Bellamy
(74) *Attorney, Agent, or Firm* — Birch, Stewart, Kolasch & Birch, LLP

(57) ABSTRACT

An apparatus for measuring the liquid level of molten metal including an image measuring device (5), a measuring probe (6), a lifting mechanism (1), a displacement sensor (11), an data processing system (4) and a correction marker(7). The lifting mechanism (1) is fixed to the molten metal container (10) or is independent of the molten metal container, the image measuring device (5) and the measuring probe (6) are installed on the lifting mechanism (1) or are independent of the lifting mechanism, and the optical axis of the image measuring device (5) is set at an angle with the geometric axis of the measuring probe (6), the measuring probe (6) is located within the field of view of the image measuring device (5), the image measuring device (5), the lifting mechanism (1) and the displacement sensor (11) are connected to the data processing system (4) respectively. A method for measuring the level of molten metal is also disclosed. The present invention is able to eliminate the influence by the slag layer floating on the molten metal and to achieve stably and continuously accurate measurement of molten metal level by using the measuring probe (6) inserting into molten metal through the slag-metal interface and having the slag thickness information after lifted.

20 Claims, 1 Drawing Sheet

(56) References Cited

FOREIGN PATENT DOCUMENTS

| | | | |
|---|---|---|---|
| DE | 29 45 251 A1 | 5/1981 | |
| FR | 2 667 003 A1 | 3/1992 | |
| JP | 63062812 A | * | 3/1988 |
| JP | 63196820 A | * | 8/1988 |
| JP | 2003-41328 A | | 2/2003 |
| JP | 2006-112954 A | | 4/2006 |
| TW | 579392 B | | 3/2004 |

* cited by examiner

APPARATUS AND METHOD FOR MEASURING THE LIQUID LEVEL OF MOLTEN METAL

TECHNICAL FIELD

The present invention relates to an apparatus for measuring the liquid level of molten metal such as molten steel and a method of measuring the liquid level of molten metal by using the apparatus.

BACKGROUND OF THE INVENTION

In continuous casting processes of the molten metal, in order to prevent heat dissipation and oxidation of molten metal, it is necessary to cover the molten metal with the right amount of slag powder which forms a flux slag layer. However, the level of the liquid metal is also a critical factor in many processes. For example, the liquid steel level in a tundish plays a role in determining the cast-on time, preventing the flux slag from getting into billet/slab and improving the melt-to-shop ratio. It is hard to measure exactly the liquid steel level, as a slag layer cover the surface of liquid steel and the slag layer thickness is uncertain.

As a conventional method of measuring the liquid metal level such as liquid steel level, a publicly known arrangement is the weighing method in which the calculation and determination of the liquid steel level is based on weighing out the total weight of the tundish and the molten steel (including slag layer) and some known parameters such as the weight and cubage of the tundish, and liquid steel density, etc. In such method, however, it was unavoidable that the calculated liquid level is often inaccurate since the thickness of the slag layer has also been included in the measurement value of the liquid steel level due to uncertain slag weight. Further measuring deviation of the liquid steel level is also inevitable since the tundish lining can be eroded inch by inch by molten steel resulting in an irregular change of the capacity of the tundish. Namely, it is almost impossible to determine the accurate correspondence relation between the change of the total weight of the tundish and the liquid steel level, so the liquid level of molten metal can hardly be calculated accurately A method of measuring the liquid level of molten steel in the ladles has been published, as disclosed in Ger Pat. No. DE2945251-A1 "Measuring level of liquid steel in ladles etc.—using laser beam directed at surface at angle to axis of imaging system". In this patent, a laser beam is incident upon the surface of slag layer floating on the molten steel so as to form a laser bright spot therein. The position height of the laser bright spot is detected by the imaging system as a measurement of liquid level of molten steel, and the displacement of the laser spot in vertical direction indicates a variation of the level of the liquid steel. In the method, however, there still remains the problem that the measurement value of molten steel level is inaccurate since an uncertain thickness of the slag layer has likewise been included in the measurement value. Further, an error is produced in a measurement value due to an uneven surface of slag layer.

The aforementioned prior art cannot determine the thickness values of slag layer floating on molten metal, so that the liquid level of molten metal cannot be measured accurately and stably. Hence, there is a strong need for a method and an apparatus for accurately measuring the thickness of slag layer and then measuring the liquid level of molten metal such as molten steel.

SUMMARY OF THE INVENTION

It is one of the objects of the present invention to eliminate the problems in the above-mentioned conventional techniques and to provide a liquid level measuring apparatus for molten metal by which the thickness of slag layer floating on surface of molten metal and the level of the liquid metal such as liquid steel can be measured in a stable and accurate manner.

To accomplish the above object, in accordance with the present invention, there is provided a liquid level measuring apparatus for molten metal of the type which comprises an image measuring device, a measuring probe, a lifting mechanism, a displacement sensor, a data processing system and a correction marker. The lifting mechanism is mounted on the molten metal container, or is independent of the molten metal container. The image measuring device is mounted on the lifting mechanism or is independent of the lifting mechanism, the optical axis of the image measuring device is set at an angle with the geometric axis of the measuring probe; The measuring probe is mounted on the lifting mechanism or is independent of the lifting mechanism, the measuring probe is located within the range of the field of view of the image measuring device. The image measuring device, the lifting mechanism and the displacement sensor are connected to the data processing system respectively.

A preferred technical arrangement, characterized in that the lifting mechanism comprises a lifting drive device, a lifting gearing connected to the lifting drive device, a bracket connected to the lifting gearing, and a fixture mounted on the bracket with which the measuring probe is vertically held.

A preferred technical arrangement, characterized in that the measuring probe is made of high-temperature refractories, such as MgO—C, or $AL_2O_3$—C, or $AL_2O_3$—C—Zr, or MgO—C—Zr, or of metal with melting point above 800° C., and is formed into a rod or tube or strip, the total length of the measuring probe is more than 100 mm longer than the thickness of the slag layer.

A preferred technical arrangement, characterized in that the measuring probe is a temperature measuring tube as a temperature sensor, in operation, which is used synchronously for the continuous temperature measurement and the level measurement of liquid steel in a tundish.

A preferred technical arrangement, characterized in that the correction marker is an annulation with more than 1 mm but less than 50 mm in thickness and more than 1 mm but less than 100 mm in height, or a clubbed or tubular or lathy object with more than 10 mm but less than 1500 mm in length and more than 2 mm but less than 200 mm in equivalent diameter, which is made of refractory materials, such as $AL_2O_3$—C, or MgO—C, or $AL_2O_3$—C—Zr, or MgO—C—Zr, or of metal with melting point above 500° C. The correction marker is hung from the bracket in the lifting mechanism, or is fixed to the non-dipping portion of the measuring probe, or is mounted on the cover or the inner wall of the molten metal container, or in a suitable place independent of the molten metal container and/or the liquid level measuring apparatus where can be able to be recognized and located by the image measuring device.

A preferred technical arrangement, characterized in that the displacement sensor is connected to the lifting mechanism; the displacement sensor is a tension rod, or a pull rope, or a resistance-type, or a photoelectric encoder-type or an image displacement sensor.

A preferred technical arrangement, characterized in that the optical axis of the image measuring device is set at an angle of 15°-70° with the geometric axis of the measuring probe.

A preferred technical arrangement, characterized in that the image measuring device can be a line array or a planar (or area) array or a point-scanning type camera, or a thermal imager.

A preferred technical arrangement, characterized in that the image measuring device is assembly housed within a cooling jacket, and a dust-proof guard is mounted in the front end thereof.

Another object of the present invention is to provide a method of measuring accurately the thickness of slag layer floating on molten metal and then the liquid level of molten metal.

To accomplish the above-mentioned objects, in accordance with the present invention, a method of measuring the liquid level of molten metal is provided, comprising the steps of:

(1) In accordance with the method of the present invention, there is provided an apparatus for measuring the liquid level of molten metal, which comprises an image measuring device, a measuring probe, a lifting mechanism, a displacement sensor, a data processing system and a correction marker. The lifting mechanism is fixed to the molten metal container, or is independent of the molten metal container. The image measuring device is installed on the lifting mechanism or is independent of the lifting mechanism. The optical axis of the image measuring device is set at an angle with the geometric axis of the measuring probe. The measuring probe is installed on the lifting mechanism or is independent of the lifting mechanism, the measuring probe is located within the range of the field of view of the image measuring device. The image measuring device, the lifting mechanism and the displacement sensor are connected to the data processing system respectively.

(2) In operation, the lifting mechanism drives the measuring probe down inserting into a molten metal, when the temperature of measuring probe reaches or approaches a thermal equilibrium with molten metal and slag layer, the measuring probe is rapidly raised by the lifting mechanism, the lifted height is more than the thickness of the slag layer, and then the image measuring device captures the thermal images of the lifted portion of the measuring probe. The thermal images are then transferred to the data processing system by which the original images are processed, analyzed and calculated. And based on characteristic of having the maximum local temperature gradient at the air-slag interface and the slag-molten metal interface, the level height values of the two interfaces can be acquire by the data processing system. The difference of the level height values of the two interfaces is just the thickness of the slag layer.

(3) It is necessary to determine the relative height of bottom of the molten metal container in the liquid metal level measuring apparatus before operating, which may be obtained by directly measuring the bottom level of the container, or by measuring the descent height of the measuring probe going down to contact with the container bottom, or known in advance.

(4) In dipping state of the measuring probe, the image measuring device captures continuously the images at intersection of the slag layer surface and the measuring probe or at intersection of the slag layer surface and the inner wall of the molten metal container, and then the intersection level height can be obtained by the data processing system by the image processing, analysis and calculation.

(5) The liquid level of molten metal could be obtained based on the intersection level height and the slag layer thickness acquired respectively in the above step (4) and (2), or based on the two interface level heights measured in the above step (2) and the lifted height of the measuring probe driven by the lifting mechanism which is measured by the displacement sensor and is input into the data processing system.

A preferred technical arrangement, characterized in that the optical axis of the image measuring device is set at an angle of 15°-70° with the geometric axis of the measuring probe.

A preferred technical arrangement, characterized in that the same or separate image measuring devices can be used to measure the thickness of the slag layer described in step (2) and the height of the surface level of the slag layer described in step (4).

According to the present invention, the measuring processes of the liquid level of molten metal are as follows:

The measuring probe driven by the lifting mechanism moves down and inserts vertically into the measured molten metal through the slag-metal interface, and the image measuring device captures the images of the surface of the slag layer around the measuring probe and the thermal images of the lifted portion of the measuring probe. And while the measuring probe reaches or approaches a thermal equilibrium with the molten metal and the slag layer, it is rapidly raised and the raised height is more than the thickness of the slag layer, and the image measuring device captures the thermal images of the raised portion of the measuring probe. And then the lifting mechanism drives the measuring probe down inserting into the molten metal and waiting for the next raising time. The above image information is transferred to the data processing system and is processed, analyzed and calculated, and based on characteristic of having the local temperature gradient at the air-slag interface and the slag-molten metal interface, the level heights of these two interfaces can be obtained. The difference of these two level heights is just the thickness of the slag layer. The molten metal level can be acquired by calculation according to the level heights of the above two interfaces, and the raised height of the measuring probe as well as the slag surface level.

Usually, the measuring probe is in the state of immerging in the molten metal. During this time, the image measuring device can continuously captures the images of the top surface of the slag layer around the measuring probe, and the data processing system can determine the level height of the surface of the slag layer. So the molten metal level can also be obtained by the slag surface level and the above obtained thickness of the slag layer.

To measure the level of the liquid metal accurately, it is necessary to determine the relative height of bottom of the molten metal container in the liquid level measuring apparatus before operating, which may be obtained by measuring directly the bottom level of the container, or by measuring the descent height of the measuring probe going down to contact with the bottom of the container, or known in advance.

In a preferred embodiment of the method according to the present invention, the image measuring device used is a video camera. The angle between the optical axis of the camera and the geometric axis of the measuring probe has large influence on the resolution of the camera. The smaller the angle, the lower is the resolution. Conversely, the larger the angle, the higher is the resolution, but the smaller is the imaged area of the measuring probe. An angle range of 15°-70° is optimal.

To enable the image measuring device to operate stably and reliably in harsh on-site environment, it is assembly housed within a cooling jacket, and a dust-proof guard is installed in the front end of it.

Thermal conductivity of materials of the measuring probe and its geometric size determine the temperature sensing speed of the measuring probe in inserting state and thermodiffusion speed in raising state thereof. The lower the temperature sensing speed of the measuring probe, the longer is the measuring time, but the faster is the disappearance speed of the temperature gradient boundaries at said two interface positions when the measuring probe was raised, so as to be not capable of measuring the level of the liquid metal. And thereby the measuring probe in accordance with the present invention is made of high-temperature refractory materials with a proper thermal conductivity, such as $AL_2O_3$—C, or MgO—C, or $AL_2O_3$—C—Zr, or MgO—C—Zr, or of metal with melting point above 800° C., which can be formed into a rod or tube or strip, the total length of the measuring probe is more than 100 mm longer than the thickness of the slag layer.

The correction marker has one or several characteristic signs, which is hung from the bracket of the lifting mechanism, or is fixed to the non-dipping portion of the measuring probe or the cover of molten metal container or its inner wall above the level of the molten metal, or in a place being independent of the molten metal container and/or the liquid level measuring apparatus where may be recognized and located by the image measuring device. The correction marker is to be used for correcting a measurement error resulting from change of the relative position between the image measuring device and the measuring probe. In operation, it is possible that the relative position between the image measuring device and the measuring probe varies from the predetermined location relationship due to some causes such as vibration and/or mechanical deformation of the lifting mechanism in high temperature environment, which will results in a change of the position or/and shape of the correction marker in the image display screen of the camera or the thermal imager, and an error is produced in a measurement value of the level of the liquid metal without correction. When such an accident takes place in operation, the predetermined relative position between the image measurement device and the measuring probe can be calculated according to change of the position and shape of the correction marker such as change of the position coordinates, arc curvature, direction, or dimensions, and thereby the measuring error of the liquid level will be corrected.

BRIEF DESCRIPTION OF THE DRAWINGS

A more complete appreciation of the present invention and many of the attendant advantages thereof will be readily understood by reference to the following detailed description of the preferred embodiments when considered in connection with the accompanying drawings. However, it should be understood that the present invention is by no means restricted by such examples.

DETAILED DESCRIPTION OF THE PREFERRED EMBODIMENTS

Embodiment 1

Figure 1:
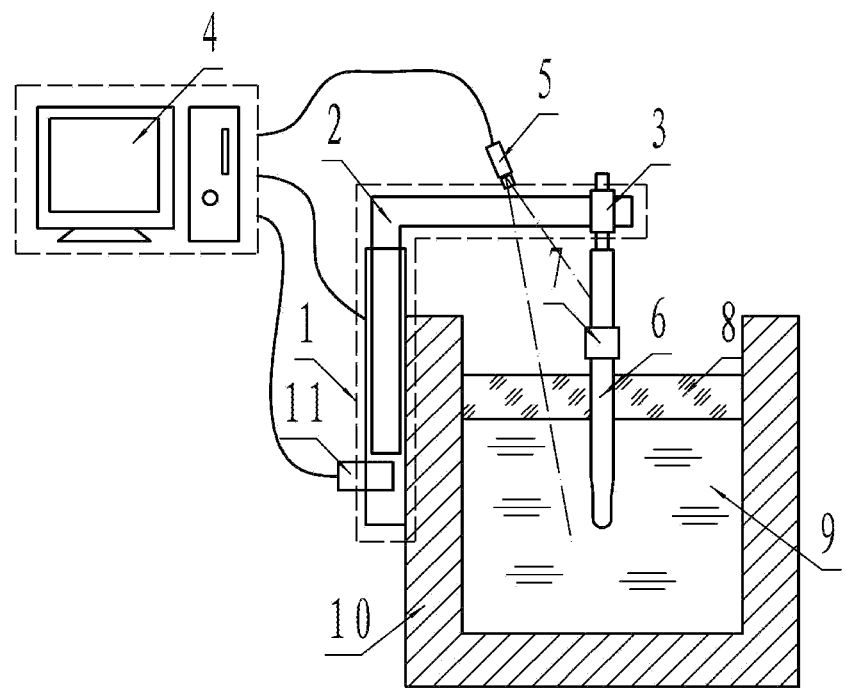
FIG. 1 illustrates schematically the structure of an embodiment of the liquid level measuring apparatus of the present invention.

As shown in FIG. 1, a liquid level measuring apparatus for molten steel comprises an image measuring device 5, a measuring probe 6, a lifting mechanism 1, a displacement sensor 11, a data processing system 4 and a correction marker 7 which is a metallic ring fixed to the non-dipping portion of the measuring probe 6 and is used to correct the change of relative position between the image measuring device 5 and the measuring probe 6. The lifting mechanism 1 is fixed to the outer wall of a tundish 10 (a molten steel container) for the continuous casting of the steel. The measuring probe 6 is vertically hung from the bracket 2 of the lifting mechanism 1 by the fixture 3, and can move up and down with the bracket driven by a motor to be inserted into molten steel 9 or to be raised from it. The displacement sensor 11 is used to measure the raised height of the measuring probe 6, and fed it back to the data processing system 4. The image measuring device 5 is also installed in the bracket 2 of the lifting mechanism 1, and the lifted portion of the measuring probe 6 from the molten metal 9 and the ring-shaped correction marker 7 are all located within the field of view of the image measuring device 5.

According to the present invention, the measuring processes of the liquid level of liquid steel are as follows:

The measuring probe 6 driven by the lifting mechanism 1 moves downwards and inserts vertically into the measured molten steel 9 in the tundish 10 to a predetermined depth through the interface of the slag layer 8 and liquid steel 9, and the image measuring device 5 captures the images of the surface of the slag layer 8 around the measuring probe 6. And while the measuring probe 6 reaches or approaches a thermal equilibrium with the liquid steel 9 and the slag layer 8, the measuring probe 6 is rapidly elevated and the lifted height is more than the thickness of the slag layer 8, the lifting height is measured by the displacement sensor 11 and is transferred to the data processing system 4. At one time, the image measuring device 5 captures the thermal images of the lifted portion of the measuring probe 6, and then the measuring probe 6 is afresh inserted into the molten steel 9. The above images are transferred to the data processing system 4 and is processed, analyzed and calculated, and the level heights of the slag-steel interface and the air-slag interface can be determined and then thickness of the slag layer is obtained. While the measuring probe 6 is in the state of immerging in the molten steel 9, the image measuring device 5 can continuously captures the images of the top surface of the slag layer 8 around the measuring probe 6, and the data processing system can determine the level height of the surface of the slag layer. So the liquid steel level can also be obtained continuously based on the slag surface level and the above obtained thickness of the slag layer or the level heights of said two interfaces.

In this embodiment, the image measuring device 5 includes a planar array CCD detector and an optical system (not shown), whose optical axis is set at an angle of 21° 46' with the geometric axis of the measuring probe 6. The image measuring device 5 is assembly housed within a cooling jacket and a dust-proof guard is mounted in front end thereof so as to ensure its reliable operating in a severe measuring condition of high temperature and thick dust.

In this embodiment, the displacement sensor 11 is a tension rod displacement sensor, which installed in the lifting mechanism 1. In another preferred embodiment of the present invention, the displacement sensor 11 is a photoelectric encoder-type displacement sensor.

The present embodiment employs the temperature measuring tube for molten steel (as disclosed in China patent No. 00120354.1) as the measuring probe 6 so as to measure the temperature and the level of liquid steel in a tundish, which consists of double bushings having a closed end at one end and an open end at the other, and the inner and the outer bushings are made of alumina-carbon ceramics with a thermal conductivity of 8.7 W/(m·K) and an outer diameter of 85 mm.

In another preferred embodiment of the present invention, the measuring probe 6 is made of magnesium-carbon which is in rod shape with a cone shape bottom end, its diameter is 40 mm.

Embodiment 2

In embodiment 2 of the present invention, the lifting mechanism 1 is mounted on the lid of the molten metal container such as the tundish 10, which is preferred without the installation conditions in the side wall of the moltern metal container. The image measuring device 5 is a point-scanning type camera, whose optical axis is set at an angle of 15° with the geometric axis of the measuring probe 6. The correction marker 7 is an annulation, and it is more than 1 mm but less than 50 mm in thickness and more than 1 mm but less than 100 mm in height. The rest are the same as those in embodiment 1.

Embodiment 3

In embodiment 3 of the present invention, the lifting mechanism 1 is mounted in a suitable position independent of the molten metal container 10, which is preferred without the installation conditions in the molten metal container. The image measuring device 5 is a line array-scanning type camera, whose optical axis is set at an angle of 70° with the geometric axis of the measuring probe 6. The correction marker 7 is a claviform or tubal or lathy object, and it is more than 10 mm but less than 1500 mm in length and more than 2 mm but less than 200 mm in equivalent diameter. The rest are the same as those in embodiment 1.

Embodiment 4

Figure 2:
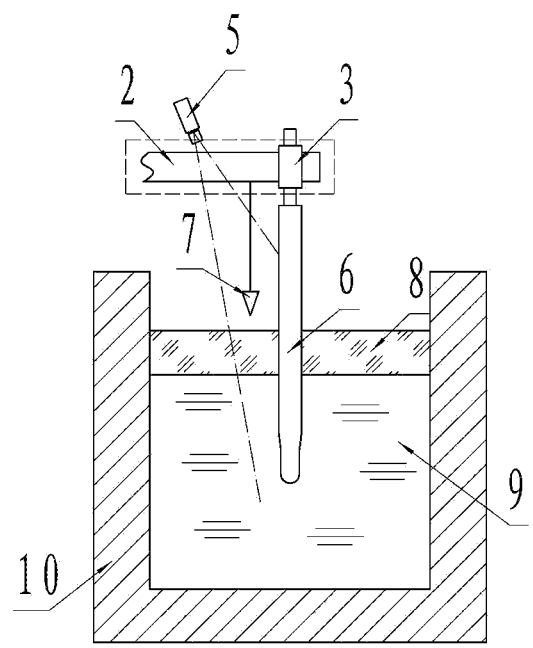
FIG. 2 illustrates schematically the structure of another embodiment of the liquid level measuring apparatus of the present invention.

In embodiment 4 of the present invention, as shown in FIG. 2, the correction marker 7 is a plumb bob being hung from the bracket 2 of the lifting mechanism 1, and is located within the field of view of the image measuring device 5. The image measuring device 5 is a thermal imager.

In this embodiment, the molten metal 9 is the molten steel, the slag layer is made from slag powder and covering flux, the metal container 10 is a tundish. The rest are the same as those in embodiment 1.

The beneficial effect of the present invention is: As the invention utilizes a measuring probe 6 which is inserted into the molten metal 9 through the slag layer, when said measuring probe 6 is lifted from the molten metal 9, the thermal image displays information relative to the thickness of the slag layer, hence allowing an accurate determination of the thickness of the slag layer and an accurate measurement of the level of the molten metal.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for measuring a liquid level of molten metal, comprising:
   an image measuring device,
   a measuring probe,
   a lifting mechanism,
   a displacement sensor,
   a data processing system, and
   a correction marker mounted either on the measuring probe or on the lifting mechanism, wherein:
   the lifting mechanism is mounted on a molten metal container, or is independent of the molten metal container;
   the image measuring device is mounted on the lifting mechanism or is independent of the lifting mechanism, and an optical axis of the image measuring device is set at an angle with a geometric axis of the measuring probe;
   the measuring probe is mounted on the lifting mechanism or is independent of the lifting mechanism, the measuring probe is located within a range or a field of view of the image measuring device; and
   the image measuring device, the lifting mechanism and the displacement sensor are connected to the data processing system respectively;
   wherein the correction marker is used for correcting a measurement error resulting from a change of a relative position between the image measuring device and the measuring probe.

2. The apparatus for measuring the liquid level of molten metal according to claim 1, wherein the lifting mechanism comprises:
   a lifting drive device, a lifting gearing connected to the lifting drive device, a bracket connected to the lifting gearing, and a fixture mounted on the bracket with which the measuring probe is vertically held.

3. The apparatus for measuring the liquid level of molten metal according to claim 1, wherein the measuring probe is made of refractory materials, including one or more of AL2O3—C, or MgO—C, or AL2O3—C—Zr, or MgO—C—Zr, or of metals with a melting point above 800° C.

4. The apparatus for measuring the liquid level of molten metal according to claim 1, wherein the measuring probe is a temperature measuring tube which is used synchronously for measuring a temperature and the liquid level of the molten steel in a tundish.

5. The apparatus for measuring the liquid level of molten metal according to claim 1, wherein the correction marker is an annulation with more than 1 mm but less than 50 mm in thickness, and more than 1 mm but less than 100 mm in height, or
   a clubbed or tubular or lathy object with more than 10 mm but less than 1500 mm in length and more than 2 mm but less than 200 mm in equivalent diameter, which is made of refractory materials including one or more of AL2O3—C, or MgO—C, or AL2O3—C—Zr, or MgO—C—Zr, or of metals with melting point above 500° C.;
   wherein the correction marker is hung from a bracket of the lifting mechanism, or is fixed to a non-dipping portion of the measuring probe.

6. The apparatus for measuring the liquid level of molten metal according to claim 1, wherein the displacement sensor is connected to the lifting mechanism; the displacement sensor is a tension rod, or a pull rope, or a resistance rope, or a photoelectric encoder, or an image displacement sensor.

7. The apparatus for measuring the liquid level of molten metal according to claim 6, wherein the optical axis of the image measuring device is set at an angle of 15°-70° with the geometric axis of the measuring probe.

8. The apparatus for measuring the liquid level of molten metal according to claim 7, wherein the image measuring device is a line array or a planar array camera, an area array camera, a camera with point scanning capability, or a thermal imager.

9. The apparatus for measuring the liquid level of molten metal according to claim 8, wherein the image measuring device is housed within a cooling jacket, and a front end of the cooling jacket is equipped with a dust-proof guard.

10. A method for measuring the liquid level of molten metal by using the apparatus according to claim 1, comprising steps of:
   (1) installing the apparatus for measuring the molten metal level on the molten metal container;
   (2) driving the measuring probe down by the lifting mechanism for inserting into the molten metal, when a temperature of the measuring probe reaches or approaches a thermal equilibrium with the molten metal and a slag layer,
   raising the measuring probe rapidly by the lifting mechanism, the raised height being more than a thickness of the slag layer, and then using the image measuring device to capture thermal images of a raised portion of the measuring probe; and then transferring the thermal images to the data processing system by which original images are processed, analyzed and calculated; and based on a characteristic of having a maximum local temperature gradient at an air-slag interface and a slag-molten metal interface, level height values of the two interfaces are acquired by the data processing system; wherein a difference of the level height values of the two interfaces is the thickness of the slag layer;

(3) determining a relative height of a bottom of the molten metal container in the liquid metal level measuring apparatus before operating, by directly measuring a level of a bottom of the container, or by measuring a descent height of the measuring probe going down to make contact with the bottom of the container, or by knowing in advance;

(4) in a dipping state of the measuring probe, capturing the images by the image measuring device continuously at an intersection of a slag layer surface and the measuring probe, or at an intersection of the slag layer surface and the inner wall of the molten metal container, and then obtaining a level height of the slag layer surface by image processing, analysis and calculation performed by the data processing system; and (5) obtaining the liquid level of the molten metal, based on the level height of the slag layer surface and the slag layer thickness acquired, respectively, in steps (4) and (2) above, or based on the two interface level heights measured in step (2) above, and the raised height of the measuring probe driven by the lifting mechanism, which is measured by the displacement sensor and is input into the data processing system.

11. The method for measuring the liquid level of molten metal according to claim 10, wherein the optical axis of the image measuring device is set at an angle of 15°-70° with the geometric axis of the measuring probe.

12. The method for measuring the liquid level of molten metal according to claim 11, wherein the same or separate image measuring devices are used to measure the thickness of the slag layer described in step (2) and the height of the surface level of the slag layer described in step (4).

13. A method for measuring the liquid level of molten metal by using the apparatus according to claim 2, comprising steps of:

(1) installing the apparatus for measuring the molten metal level on the molten metal container;

(2) driving the measuring probe down by the lifting mechanism for inserting into the molten metal, when a temperature of the measuring probe reaches or approaches a thermal equilibrium with the molten metal and a slag layer, raising the measuring probe rapidly by the lifting mechanism, the raised height being more than a thickness of the slag layer, and then using the image measuring device to capture thermal images of a raised portion of the measuring probe; and then transferring the thermal images to the data processing system by which original images are processed, analyzed and calculated; and based on a characteristic of having a maximum local temperature gradient at an air-slag interface and a slag-molten metal interface, level height values of the two interfaces are acquired by the data processing system; wherein a difference of the level height values of the two interfaces is the thickness of the slag layer;

(3) determining a relative height of a bottom of the molten metal container in the liquid metal level measuring apparatus before operating, by directly measuring a level of the bottom of the container, or by measuring a descent height of the measuring probe going down to make contact with the bottom of the container, or by knowing in advance;

(4) in a dipping state of the measuring probe, capturing the images by the image measuring device continuously at an intersection of a slag layer surface and the measuring probe, or at an intersection of the slag layer surface and the inner wall of the molten metal container, and then obtaining a level height of the slag layer surface by image processing, analysis and calculation performed by the data processing system; and (5) obtaining the liquid level of the molten metal, based on the level height of the slag layer surface and the slag layer thickness acquired, respectively, in steps (4) and (2) above, or based on the two interface level heights measured in step (2) above, and the raised height of the measuring probe driven by the lifting mechanism, which is measured by the displacement sensor and is input into the data processing system.

14. A method for measuring the liquid level of molten metal by using the apparatus according to claim 3, comprising steps of:

(1) installing the apparatus for measuring the molten metal level on the molten metal container;

(2) driving the measuring probe down by the lifting mechanism for inserting into the molten metal, when a temperature of the measuring probe reaches or approaches a thermal equilibrium with the molten metal and a slag layer, raising the measuring probe rapidly by the lifting mechanism, the raised height being more than a thickness of the slag layer, and then using the image measuring device to capture thermal images of a raised portion of the measuring probe; and then transferring the thermal images to the data processing system by which original images are processed, analyzed and calculated; and based on a characteristic of having a maximum local temperature gradient at an air-slag interface and a slag-molten metal interface, level height values of the two interfaces are acquired by the data processing system; wherein a difference of the level height values of the two interfaces is the thickness of the slag layer;

(3) determining a relative height of a bottom of the molten metal container in the liquid metal level measuring apparatus before operating, by directly measuring a level of the bottom of the container, or by measuring a descent height of the measuring probe going down to make contact with the bottom of the container, or by knowing in advance;

(4) in a dipping state of the measuring probe, capturing the images by the image measuring device continuously at an intersection of a slag layer surface and the measuring probe, or at an intersection of the slag layer surface and the inner wall of the molten metal container, and then obtaining a level height of the slag layer surface by image processing, analysis and calculation performed by the data processing system; and (5) obtaining the liquid level of the molten metal, based on the level height of the slag layer surface and the slag layer thickness acquired, respectively, in steps (4) and (2) above, or based on the two interface level heights measured in step (2) above, and the raised height of the measuring probe driven by the lifting mechanism, which is measured by the displacement sensor and is inputted into the data processing system.

15. A method for measuring the liquid level of molten metal by using the apparatus according to claim 4, comprising steps of:

(1) installing the apparatus for measuring the molten metal level on the molten metal container;

(2) driving the measuring probe down by the lifting mechanism for inserting into the molten metal, when a temperature of the measuring probe reaches or approaches a thermal equilibrium with the molten metal and a slag layer, raising the measuring probe rapidly by the lifting mechanism, the raised height being more than a thickness of the slag layer, and then using the image measuring device to capture thermal images of a raised portion of the measuring probe; and then transferring the thermal images to the data processing system by which original images are processed, analyzed and calculated; and based on a characteristic of having a maximum local temperature gradient at an air-slag interface and a slag-molten metal interface, level height values of the two interfaces are acquired by the data processing system; wherein a difference of the level height values of the two interfaces is the thickness of the slag layer;

(3) determining a relative height of a bottom of the molten metal container in the liquid metal level measuring apparatus before operating, by directly measuring a level of the bottom of the container, or by measuring a descent height of the measuring probe going down to make contact with the bottom of the container, or by knowing in advance;

(4) in a dipping state of the measuring probe, capturing the images by the image measuring device continuously at an intersection of a slag layer surface and the measuring probe, or at an intersection of the slag layer surface and the inner wall of the molten metal container, and then obtaining a level height of the slag layer surface by image processing, analysis and calculation performed by the data processing system; and (5) obtaining the liquid level of the molten metal, based on the level height of the slag layer surface and the slag layer thickness acquired, respectively, in steps (4) and (2) above, or based on the two interface level heights measured in step (2) above, and the raised height of the measuring probe driven by the lifting mechanism, which is measured by the displacement sensor and is inputted into the data processing system.

16. The apparatus for measuring the liquid level of molten metal according to claim 1, wherein when the relative position between the image measuring device and the measuring probe varies from a predetermined location relationship due to a vibration and/or a mechanical deformation of the lifting mechanism in a high temperature environment, the apparatus is adapted to show a change of a position and/or shape of the correction marker on a display screen of the image measuring device, and to correct the measuring error of the liquid level by calculating the predetermined location relationship between the image measurement device and the measuring probe.

17. The apparatus for measuring the liquid level of molten metal according to claim 1, wherein when the relative position between the image measuring device and the measuring probe varies from a predetermined location relationship due to a vibration and/or a mechanical deformation of the lifting mechanism in a high temperature environment, the apparatus is adapted to show a change of a position and/or shape of the correction marker on a display screen of the image measuring device, and to correct the measuring error of the liquid level by calculating the predetermined location relationship between the image measurement device and the measuring probe wherein the correction marker is mounted on the measuring probe.

18. The apparatus for measuring the liquid level of molten metal according to claim 17, wherein the correction marker is ring-shaped member.

19. The apparatus for measuring the liquid level of molten metal according to claim 1, wherein the correction marker is mounted on the lifting mechanism.

20. The apparatus for measuring the liquid level of molten metal according to claim 19, wherein the correction marker is a plum bob hung from a horizontal bracket of the lifting mechanism.

* * * * *